(12) United States Patent
De Haan et al.

(10) Patent No.: US 7,881,500 B2
(45) Date of Patent: Feb. 1, 2011

(54) MOTION ESTIMATION WITH VIDEO MODE DETECTION

(75) Inventors: Gerard De Haan, Eindhoven (NL); Calina Ciuhu, Endhoven (NL)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1068 days.

(21) Appl. No.: 11/570,800

(22) PCT Filed: Jun. 21, 2005

(86) PCT No.: PCT/IB2005/052030

§ 371 (c)(1), (2), (4) Date: Dec. 18, 2006

(87) PCT Pub. No.: WO2006/003545

PCT Pub. Date: Jan. 12, 2006

(65) Prior Publication Data

US 2007/0165957 A1    Jul. 19, 2007

(30) Foreign Application Priority Data

Jun. 30, 2004    (EP) .................. 04103082

(51) Int. Cl.
*G06K 9/00*    (2006.01)
(52) U.S. Cl. .................................... 382/107
(58) Field of Classification Search ................ 382/107; 348/448, 449, 452
See application file for complete search history.

(56) References Cited

U.S. PATENT DOCUMENTS

| 6,340,990 B1 | 1/2002 | Wilson .................. 348/448 |
| 6,385,245 B1 | 5/2002 | De Haan et al. ........ 375/240.16 |
| 6,546,120 B1 * | 4/2003 | Etoh et al. .............. 382/107 |
| 2002/0131499 A1 | 9/2002 | De Haan et al. ........ 375/240.12 |

FOREIGN PATENT DOCUMENTS

| EP | 0994626 A1 | 4/2000 |
| EP | 1198139 A1 | 4/2002 |
| JP | 2003179886 A | 6/2003 |
| WO | WO9524100 A1 | 9/1995 |
| WO | WO9633571 A2 | 10/1996 |

OTHER PUBLICATIONS

International Search Report of International Appliation No. PCT/IB2005/052030 Contained in International Publication No. WO2006003545.
Written Opinion of the International Searching Authority for International Application No. PCT/IB2005/052030.
Bellers et al: "Advanced Motion Estimation and Motion Compensated De-Interlacing"; SMPTE Journal, SMPTE Inc., vol. 106, No. 11, Nov. 1997, pp. 777-786, XP000725526.
Schu et al: "System on Silicon-IC for Motion Compensated Scan Rate Conversion, Picture-In-Picture Processing, Split Screen Applications and Display Processing"; IEEE Transactions on Consumer Electronics, IEEE Inc., vol. 45, No. 3, Aug. 1999, pp. 842-850, XP000927003.
De Haan: "Progress in Motion Estimation for Consumer Video Format Conversion", IEEE Transactions on Consumer Electronics, vol. 46, No. 3, Aug. 2000, pp. 449-459.

* cited by examiner

*Primary Examiner*—Andrew W Johns
(74) *Attorney, Agent, or Firm*—DLA Piper LLP (US)

(57) ABSTRACT

The invention relates to a method for providing a motion parameter set and/or a picture repetition pattern from an input video signal, in particular for de-interlacing a video signal with using a candidate motion parameter set weighted with a picture repetition pattern value for calculating a motion compensated pixel from a pixel value of a first image. To provide motion compensation which accounts for field repetition patterns, minimizing an error criterion between at least one pixel value of a second image and at least the motion compensated pixel value by iterating the calculation of the motion compensated pixel with at least two candidate motion parameters sets and/or at least two picture repetition values, and putting out the candidate motion parameter set and/or the picture repetition value which provides the minimized error criterion is proposed.

18 Claims, 2 Drawing Sheets

MOTION ESTIMATION WITH VIDEO MODE DETECTION

Figure 1:
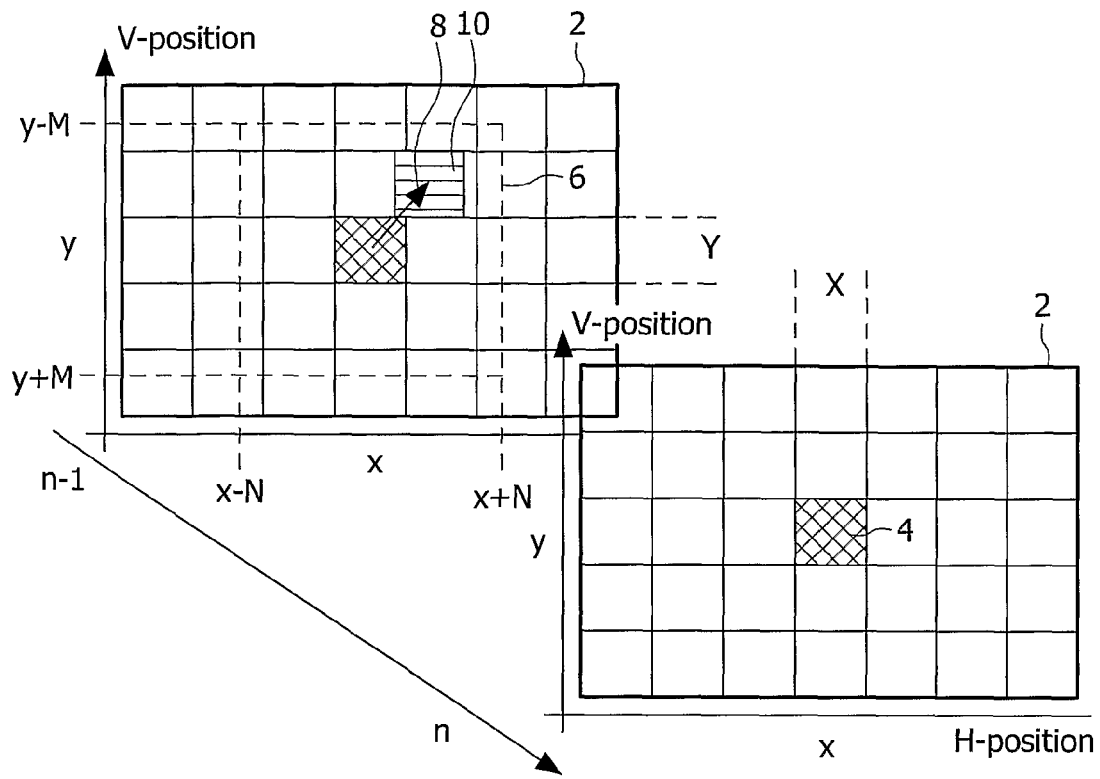

The invention relates to a method for providing a motion parameter set and/or a picture repetition pattern from an input video signal, in particular for de-interlacing a video signal, with using a candidate motion parameter set weighted with a picture repetition pattern value for calculating a motion compensated pixel from a pixel value of a first image.

The invention also relates to a computer program and a computer program product for providing a motion parameter set and/or a picture repetition pattern from an input video signal, in particular for de-interlacing a video signal, the program comprising instructions operable to cause a processor to use a candidate motion parameter set weighted with a picture repetition pattern value for calculating a motion compensated pixel from a pixel value of a first image.

Finally, the invention relates to a computer or an integrated circuit for motion parameter set and/or a picture repetition pattern from an input video signal, in particular for de-interlacing a video signal, comprising motion compensation means to calculate a motion compensated pixel from a pixel value of a first image using a candidate motion parameter set weighted with a picture repetition pattern value.

With the advent of new technology in the field of video processing, the motion compensated video algorithms became affordable as well as necessary for high quality video processing. To provide high quality video processing, different motion compensation applications are provided. Applications such as motion compensated (MC) filtering for noise reduction, MC prediction for coding, MC de-interlacing for conversion from interlaced to progressive formats, or MC picture rate conversions are known. These applications benefit from motion estimation (ME) algorithms, for which various methods are known.

One example of a motion estimation algorithm in video format conversion, which is a blocked base motion estimator, is known as 3D recursive search (3D RS) block-matcher.

Motion estimation algorithms were based on the assumption, that the luminance or chrominance value of a pixel may be approximated by a linear function of the position. This assumption may only be correct for small displacements. The limitation may, however, be resolved by pixel-based motion estimation methods (PEL-recursive methods). The implementation of motion estimation also includes block estimation. In block matching motion estimation algorithms, a displacement vector $\vec{D}$ is assigned to the center $\vec{X}$ of a block of pixels $B(\vec{X})$ in the current field n, by searching a similar block within a search area $SA(\vec{X})$, also centered at $\vec{X}$, but in a temporary neighboring field, for example n−1, n+1. The similar block may have a center, which may be shifted with respect to $\vec{X}$ over the displacement $\vec{D}(\vec{X}, n)$. To find $\vec{D}(\vec{X}, n)$, a number of candidate vectors $\vec{C}$ are evaluated, applying an error measure $\epsilon(\vec{C}, \vec{X}, n)$, which quantifies block similarities.

FIG. 1 depicts such a block-matching motion estimation algorithm. Shown are two temporal instances n−1, n of an image sequence 2. Within image sequence 2, various blocks 4 at horizontal position X and vertical position Y are determined. To determine the displacement $\vec{D}(\vec{X}, n)$ of a block 4, various candidate vectors $\vec{C}$ 8 may be evaluated applying the above-mentioned error measure $\epsilon(\vec{C}, \vec{X}, n)$. One possible error measure may be the assumed absolute difference (SAD) criterion, which is $$SAD(\vec{C}, \vec{X}, n) = \sum_{\vec{x} \in B(\vec{X})} |F(\vec{x}, n) - F(\vec{x} - \vec{C}, n - p)|$$

where $F(\vec{x}, n)$ is the luminance value of pixels within block 4. The displacement vector $\vec{D}$ is assigned to the center $\vec{X}$ of a block 4 of pixel positions $B(\vec{X})$ in the current image by searching a similar block 10 within a search area $SA(\vec{X})$ 6, also centered at $\vec{X}$, but in a previous or following image. This may be a temporally previous or following image or field. A correlation measure between the two blocks 4, 10 is therefore optimized to identify the displacement vector $\vec{D}$.

Further error criteria, such as Mean Square Error, and Normalized Cross Correlation Function may be used. Particularly the last may be used in case of calculating in the Fourier domain. A further example of an error criterion may be the number of significantly different pixels.

Rather than estimating motion vectors for pixels, or blocks, motion estimators are known to divide the image into larger regions, sometimes referred to as object-based motion estimation, and estimate the motion for the individual regions. Furthermore, it is known to estimate motion parameters sets comprising, in addition to horizontal and vertical displacements, also motion parameters describing scaling (or zooming), rotation, etc. This is particularly useful for larger blocks, and in region or object-based motion estimation. In the following the term motion parameter sets may be used in all cases, i.e. including parameter sets with only translation, also referred to as motion vectors, as well as motion parameter sets with 4 (translation and zooming), 6 (further including rotation), 8, 12, or any other integer number of motion parameters.

However, to cope with various video materials, including material that has been originated on film, a motion compensated video processing algorithms requires, in addition to the motion parameters, specifications about the picture repetition patterns. Current motion estimations only provide motion parameters, such as the motion vector per block or per pixel, which do not account for picture repetition patterns. A displacement between two successive temporal images does not provide the whole knowledge about the motion in the video signal. Not accounting for picture repetition patterns may result in erroneous displacement vectors, particularly if the motion estimator has a recursive search strategy. Moreover, some applications, e.g. de-interlacing, may need the additional information about the picture repetition pattern in order to properly perform their task.

In general, it is possible to distinguish at least three different modes of video among the existing video material. A so-called 50 Hz film mode comprises pairs of two consecutive fields originating from the same image. This film mode is also called 2-2 pull-down mode. This mode often occurs, when a 25 pictures/second film is broadcasted for 50 Hz television. For example, if the algorithm refers to a motion compensated de-interlacing, if it is known which fields belong to the same image, the de-interlacing reduces to field insertion.

In countries with 60 Hz power supply, a film is run at 24 pictures/second. In such a case a so-called 3-2 pull-down mode is required to broadcast film for television. In such a case, successive single film images are repeated within three or two fields, respectively, resulting in a ratio of 60/24=2.5 on the average. Again, a field insertion can be applied for de-interlacing, if the repetition pattern is known.

If any two consecutive fields of a video sequence belong to different images, the sequence is in a video mode, and de-interlacing has to be applied with a particular algorithm in order to obtain a progressive sequence.

It is also known that a combination of film mode and video mode appears within a sequence. In such a so-called hybrid mode, different de-interlacing methods have to be applied to different fields. In a hybrid mode, some regions of the sequence belong to a video mode, while the complementary regions may be in film mode. If field insertion is applied for de-interlacing a hybrid sequence, the resulting sequence exhibits so-called teeth artifacts in the video-mode regions. On the other hand, if a video de-interlacing algorithm is applied, it introduces undesired artifacts, such as flickering, in the film-mode regions.

In U.S. Pat. No. 6,340,990, de-interlacing of hybrid sequences is described. A method is disclosed, which proposes to use multiple motion detectors to discriminate between the various modes and adapt the de-interlacing, accordingly. Since the proposed method does not use motion compensation, the results in moving video parts are poor.

Similarly, when motion estimation is designed for application within another algorithm, i.e. picture up conversion, noise reduction or any other, it may be essential that, in addition to the motion vectors, the picture repetition pattern is known as well.

Therefore, one object of the invention is to provide motion estimation, which accounts for field repetition patterns. A further object of the invention is to provide improved motion estimation. Another object of the invention is to provide motion estimation, which is not disturbed due to field repetition patterns in the original video material.

These and other objects of the invention may be solved by a method for providing a motion parameter set and/or a picture repetition pattern from an input video signal, in particular for de-interlacing a video signal, with using a candidate motion parameter set weighted with a picture repetition pattern value for calculating a motion compensated pixel from a pixel value of a first image, minimizing an error criterion between at least one pixel value of a second image and at least the motion compensated pixel value by iterating the calculation of the motion compensated pixel with at least two candidate motion parameters sets and/or at least two picture repetition values, and putting out the candidate motion parameter set and/or the picture repetition value that provides the minimized error criterion.

The invention may, for example, be used for de-interlacing, picture rate conversion, or any other application that benefits from knowledge about a picture repetition mode detection.

The invention provides motion estimation, which accounts for picture repetition patterns. Additional information about the picture repetition in a temporal succession of fields is accounted for using a picture repetition value. To account for different modes in the video, and to allow determining these different modes, it may be in particular useful to determine the minimized error criterion from at least three temporal instances of images. The motion parameter set may be weighted with different picture repetition values for any two images and the different possible picture repetition patterns may be accounted for. Thereby, the most likely picture repetition pattern may be detected. The iteration of the calculation of the motion compensated pixel with the candidate motion parameters sets and the picture repetition values may be done in parallel, to provide the results faster.

This picture repetition value, also called field repetition value, may be a coefficient of a displacement vector. This coefficient may be chosen such that the field repetition in successive fields of a video may be accounted for. Weighting the candidate motion parameter may be done by multiplying the chosen candidate motion parameter set, or any value thereof, such as a motion vector, with the picture repetition pattern value. To calculate the picture repetition pattern value, it may be necessary to take into account the motion between more than two temporal instances of fields. This may for example be the current, the previous and the following fields.

Moreover, as the relation between the motion parameter set with respect to the previous field and the motion parameter set with respect to the next field may depend on the picture repetition pattern at block or object level, this needs to be accounted for. Picture repetition patterns may not only be accounted for on image level, e.g. the field repetition is within the whole image, but also on block and/or object level.

Minimization of the difference may be carried out using the Summed Absolute Difference (SAD) criterion, the Mean Square Error criterion, the Normalized Cross Correlation Function criterion, or any other error function suitable.

Embodiments according to claim 3 and 4 are also preferred.

According to embodiments, choosing a motion vector from the motion parameter set is suitable for providing good de-interlacing results. The motion vector may be a candidate motion vector. Different candidate motion vectors may be tested, and the candidate vector that yields the smallest difference may be chosen as the displacement vector, in particular for de-interlacing.

Motion estimation may provide good results in case the image is segmented into groups of pixels and the error criterion between the groups of pixels of a second image and motion compensated groups of pixels of a first image is minimized. Also a third image may be used, and the error criterion may be calculated within the three images. Repetition patterns may be accounted spatially within the groups and objects within an image. This may result in accounting for repetition patterns only applying to spatially particular areas or fields within the image and not only the entire image.

To account for error criteria between a preceding and a current image, as well as between a following and a current image, the methods of claim 6 and 7 are provided according to embodiments.

To account for different video modes, a first and a second weighted motion parameter set for motion compensation may be used as candidate motion parameter set. Also, a third and fourth weighted motion parameter set may be used as candidate motion parameter set. These may be used for differentiating between images of a previous, current and following temporal instance.

To account for film mode, or zero mode the first and the third motion parameter sets may result from weighting with a picture repetition pattern value chosen to be a zero.

To account for video mode, the second and fourth motion parameter sets may result from weighting with picture repetition pattern values that are chosen to have equal absolute values. For instance, the weighted motion parameter sets may be chosen as motion vectors with an equal length but having opposite directions.

To account for motion patterns throughout at least three temporal instances, a method according to claim 13 is provided, according to embodiments.

As the motion estimation criteria compares existing pixel values from one temporal instance of an image with existing pixel values of another temporal instance of an image, it may occur in interlaced material these pixels are not provided at all times. This may depend on the interlacing phase. Insofar, it may be possible to attribute the missing pixel calculated at a certain position by means of an interpolation algorithm. This may be achieved, e.g. by interpolating the missing pixel values using a generalized sampling theory (GST) interpolation filter.

As local motion acceleration, i.e. motion that is not uniform over two picture periods may provide errors in the mode detection and the motion estimation, a penalty system may be provided according to embodiments. This penalty system may account for the majority mode in neighboring fields or frames, which majority mode may account for a penalty value that is given to the alternative modes which are detected in the current field or frame. If within the current field or frame n the video mode is established as majority mode, a penalty may be given to a film mode or a zero mode when determining the mode of the following field or frame n+1. If for the current field or frame n and the film mode was detected as majority mode, a penalty may be given to the alternative film or video mode in the following field or frame.

Another aspect of the invention is a computer program for providing a motion parameter set and/or a picture repetition pattern from an input video signal, in particular for de-interlacing a video signal, the program comprising instructions operable to cause a processor to use a candidate motion parameter set weighted with a picture repetition pattern value for calculating a motion compensated pixel from a pixel value of a first image, minimize an error criterion between at least one pixel value of a second image and at least the motion compensated pixel value by iterating the calculation of the motion compensated pixel with at least two candidate motion parameters sets and/or at least two picture repetition values, and put out the candidate motion parameter set and/or the picture repetition value which provides the minimized error criterion.

A further aspect of the invention is a computer program product for providing a motion parameter set and/or a picture repetition pattern from an input video signal, in particular for de-interlacing a video signal, with a computer program stored thereon, the program comprising instructions operable to cause a processor to use a candidate motion parameter set weighted with a picture repetition pattern value for calculating a motion compensated pixel from a pixel value of a first image, minimize an error criterion between at least one pixel value of a second image and at least the motion compensated pixel value by iterating the calculation of the motion compensated pixel with at least two candidate motion parameters sets and/or at least two picture repetition values, and put out the candidate motion parameter set and/or the picture repetition value which provides the minimized error criterion.

An additional aspect of the invention is a computer for providing a motion parameter from an input video signal, in particular for de-interlacing a video signal, comprising motion compensation means to calculate a motion compensated pixel from a pixel value of a first image using a candidate motion parameter set weighted with a picture repetition pattern value, calculation means to minimize an error criterion between at least one pixel value of a second image and at least the motion compensated pixel value by iterating the calculation of the motion compensated pixel with at least two candidate motion parameters sets and/or at least two picture repetition values, and choosing means to put out the candidate motion parameter set and/or the picture repetition value which provides the minimized error criterion.

These and others aspects of the invention will become apparent from and elucidated with reference to the following embodiments.

IN THE DRAWINGS SHOW

Figures 2A, 2B:
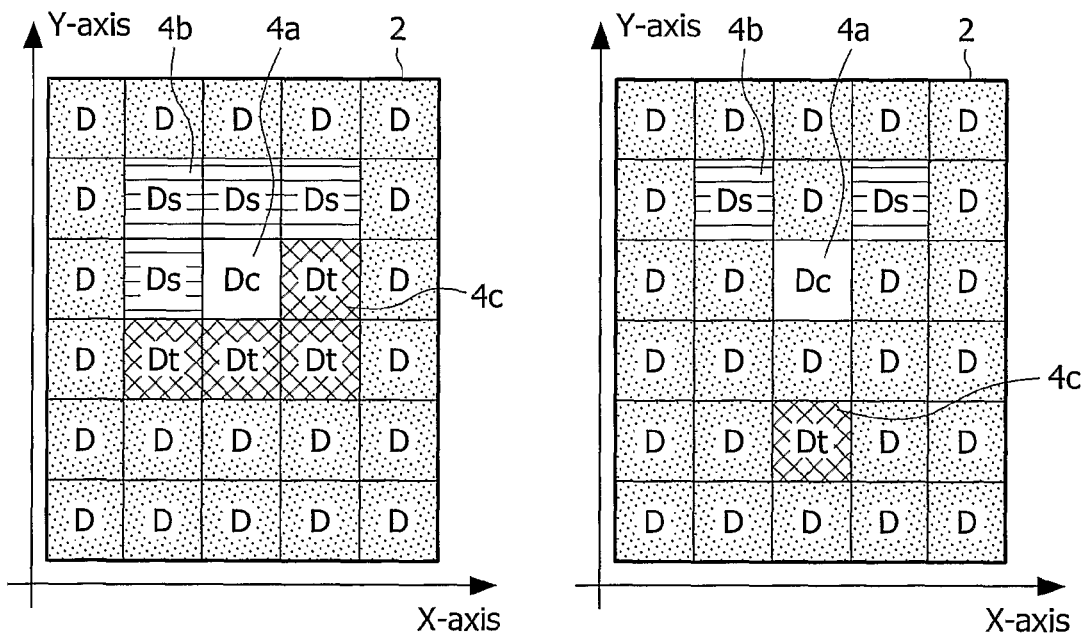
Figure 3:
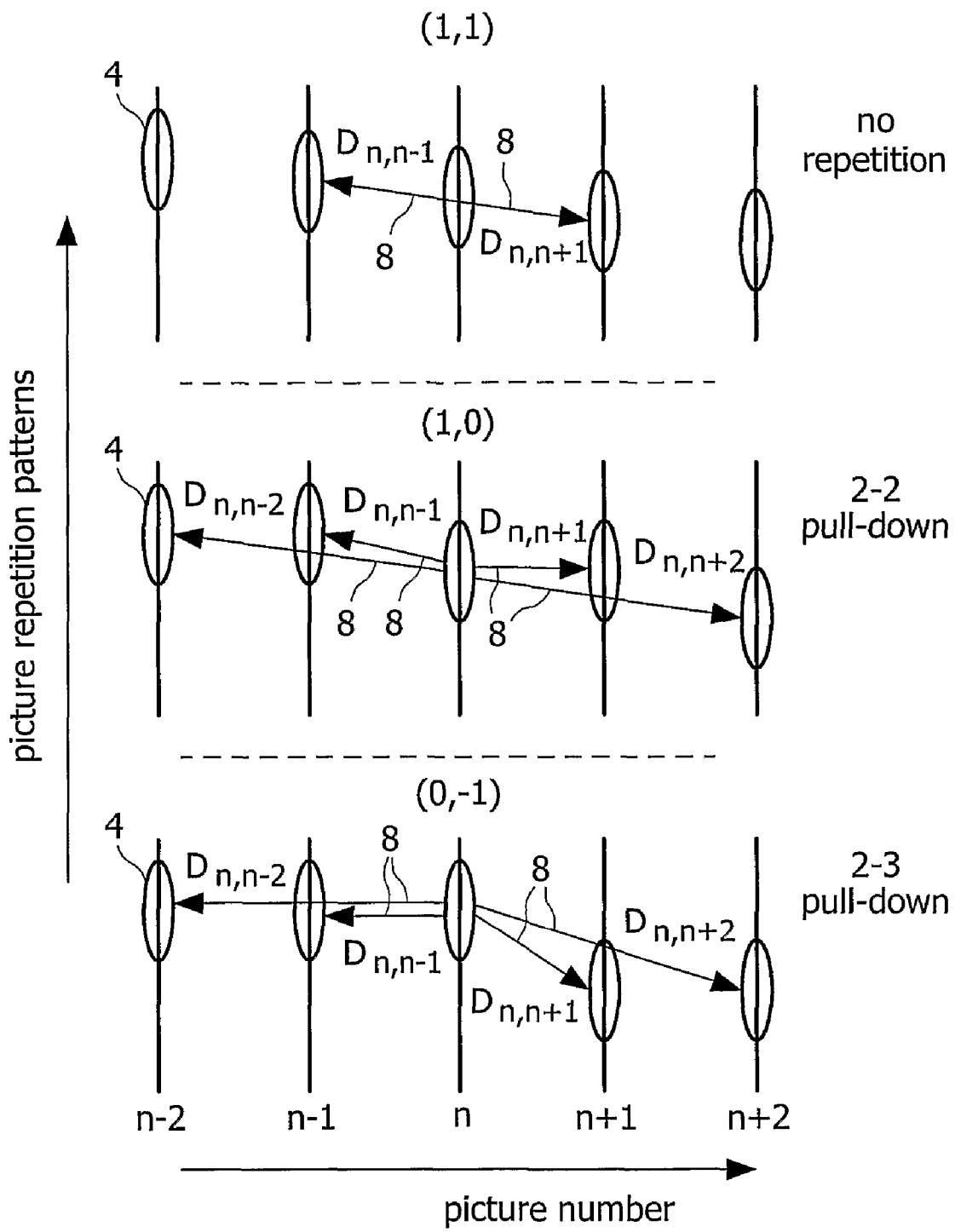

FIG. 1 an illustration of a block matching;

FIG. 2a and FIG. 2b illustrations of candidate sets of vectors of a recursive search block-matcher, FIG. 3 an illustration of different picture repetition patterns with the same motion parameters;

The block-matcher as depicted in FIG. 1 has been described above. A block 4 in the current image n and a test block 10 within the search area 6 in the previous image n−1 are connected using candidate vector $\vec{C}$ 8. A correlation measure, the match error between the two blocks 4, 10 may be optimized to identify the best candidate vector $\vec{C}$ 8. By that, different test block 10 using different candidate vectors $\vec{C}$ 8 may be tested and the match error may be minimized for a best matching candidate vector.

Searching the minimum of a match criterion in a block-matcher, is a two dimensional optimization problem for which many solutions are available. One possible implementation uses a three-step block-matcher, a 2D logarithmic, or cross search method, or the one-at-a-time-search block-matching. Different block-matching strategies are disclosed in G. de Haan, "Progress in Motion Estimation for Consumer Video Format Conversion", IEEE transactions on consumer electronics, vol. 46, no. 3, August 2000, pp. 449-459.

One possible implementation of an optimization strategy may be a 3D recursive search block-matcher (3D RS). This 3D RS accounts for that for objects larger than blocks, a best candidate vector may occur in the spatial neighborhood of a pixel or block.

As depicted in FIG. 2a, assuming a scanning direction from left to right, and from top to bottom, causality prohibits the use of spatial prediction vectors 4 Ds, right and below the current block Dc 4a. Instead, temporal prediction vectors D 4c need to be used. In relation to a current block Dc 4a, within a search area 2, spatial prediction vectors Ds 4b and temporal prediction vectors Dt 4c are available. As only blocks that already have been scanned may be used for spatial prediction of the current block Dc 4a, spatial prediction is only possible with the blocks Ds 4b. Temporal prediction is possible with the blocks Dt 4c, as from a previous temporal instance of search area 2, information about the blocks Dt 4c may be available.

FIG. 2b shows the use of two spatial prediction vector Ds 4b and one temporal prediction vector Dt 4c to predict a current block 4a.

It has been found that evaluating all possible vectors within the search range makes no sense. It may already be sufficient to evaluate vectors taken from spatially neighboring blocks such as:

$$CS(\vec{X}, n) = \left\{ \vec{C} \in CS^{max} \mid \vec{C} = \vec{D}(\vec{X} + \begin{pmatrix} iX \\ jY \end{pmatrix}, n) \right\},$$

$$i, j = -1, 0, -1$$

where CSmax is defined as a set of candidate vectors $\vec{C}$ describing all possible displacements (integers, or non-integers on the pixel grid) with respect to $\vec{X}$ within the search area $SA(\vec{x})$ in the previous image as $$CS^{max} = \{\vec{C} \mid -N \leq C_x \leq +N, -M \leq C_y \leq +M\},$$

where n and m are constants limiting $SA(\vec{X})$. To reduce calculations overhead, it may be sufficient to evaluate vectors $\vec{C}$ only taken from the spatially neighboring blocks CS. X, Y may define the block width and height, respectively. Causality and the need for pipelining in the implementation prevents that all neighboring blocks are available, and at initialization, all vectors may be zero.

To account for the availability of the vectors, those vectors that have not yet been calculated in the current image may be taken from the corresponding location in the previous vector field. FIG. 2a illustrates the relative position of the current block Dc 4a and the block from which the result vectors are taken as candidate vectors Ds 4b, Dt 4c. In case the blocks are scanned from top left to bottom right, the candidate set may be defined as $$CS(\vec{X}, n) = \left\{ \vec{C} \in CS^{max} \mid \vec{C} = \vec{D}\left(\begin{array}{c} \vec{X} + (k, -1) \cdot \\ \binom{X}{Y} \end{array}, n\right) \vee \vec{C} = \vec{D}\left(\binom{X+(i,j)\cdot}{\binom{X}{Y}}, n-1\right) \right\}$$

$$k = -1, 0, 1$$
$$i = -1, 0, 1$$
$$j = 0, 1$$

This candidate set CS implicitly assumes spatial and/or temporal consistency.

The problem of zero vectors at initialization may be accounted for by adding an update vector. One possible implementation of omitting some spatio-temporal predictions from the candidate set is depicted in FIG. 2b, where the candidate set $Cs((\vec{X}, n)$ may be defined by $$CS(\vec{X}, n) = \left\{ \begin{array}{c} \left(\vec{D}\left(\vec{X} - \binom{X}{Y}, n\right) + \vec{U}_1(\vec{X}, n)\right), \\ \left(\vec{D}\left(\vec{X} - \binom{-X}{Y}, n\right) + \vec{U}_2)\vec{X}, n)\right), \\ \left(\vec{D}\left(\vec{X} + \binom{0}{2Y}, n-1\right)\right) \end{array} \right\}$$

where the update vectors $\vec{U}_1(\vec{X}, n)$ and $\vec{U}_2(\vec{X}, n)$ may be alternately available, and taken from a limited fixed integer, or non-integer, update set, such as $$US_i(X, n) = \left\{ \begin{array}{c} \vec{0} \\ \vec{y}_u, -\vec{y}_u, \vec{x}_u, -\vec{x}_u, \\ 2\vec{y}_u, -2\vec{y}_u, 3\vec{x}_u, -3\vec{x}_u, \end{array} \right\}$$

-continued $$\text{with } \vec{x}_u = \binom{1}{0}, \text{ and } \vec{y}_u = \binom{0}{1}$$

A model capable of describing more complex object motion than only translation, for instance rotation, or scaling, may use segmenting the image in individual 20 objects and estimating motion parameter sets for each of these objects. As the number of blocks usually exceeds the number of objects with more than an order of magnitude, the number of motion parameters that needs to be calculated per image is reduced. However, the calculation complexity increases.

According to embodiments, a pixel block object may be determined, which may be referred to as a group of pixels. A motion parameter, for example a motion vector for each group of pixels, may be determined. Candidate vectors may be tested by calculating the summed absolute difference between the luminance values of the group of pixels in the current image and the corresponding motion compensated luminance values in a second temporally neighboring image. Two temporal instances may be used in order to estimate the motion parameter sets of a local group of pixels.

For some applications in video format conversion, additional information about the picture repetition pattern in a succession of images may be necessary.

FIG. 3 depicts different displacement vectors D 8, between two successive temporal images of blocks of pixels 4. One of these vectors 8 may not provide the whole knowledge about the motion in a sequence. A displacement vector 8 may only represent the displacement between two instances n, and n−1 or n+1 of an image. However, a displacement between the images n, n−1 and n, n+1 may differ. Insofar, embodiments provide taking into account the motion between more than two temporal instances, for example, the current n, the previous n−1, and the next n+1 frames/fields. The relation between the different motion vectors 8 with respect to the previous field $\vec{D}_{n,n-1}$ and the next field $\vec{D}_{n,n+1}$ may depend on the picture repetition pattern at a block or object level. Different picture repetition patterns may be caused by different sources, such as video and film, which may be modeled as follows.

In case a sequence is in video mode, the vectors 8 are $\vec{D}_{n,n-1} = -\vec{D}_{n,n-1}$ assuming linear motion over two field periods, as depicted in FIG. 3a. In such a case, no repetition occurs. This may be called the (1, −1) mode, where 1 and −1 are the picture repetition pattern values with which the respective motion vectors are weighted.

In case the sequence is in a 2-2 pull down film mode, the displacement vectors 8 may be either $\vec{D}_{n,n+1} = \vec{0}$ and $\vec{D}_{n,n-1} \neq \vec{0}$ or $\vec{D}_{n,n+1} \neq \vec{0}$ and $\vec{D}_{n,n+1} = \vec{0}$. In such a case, different values of displacement vectors need to be applied to successive temporal instances of an image. These different displacement vectors are shown in FIG. 3b. The mode may be called (0, −1) or (1,0) mode, where 0, −1 and 1 are the picture repetition pattern values with which the respective motion vectors are weighted.

A 2-3 pull down mode or in case a sequence contains non moving objects, results in displacement vectors $\vec{D}_{n,n+1} = \vec{D}_{n,n-1} = \vec{0}$. This may be the (0,0) mode.

Given the relation between the displacements vectors D in various video mode phases, video mode may be referred to as (1, −1) mode, film mode may be referred to as (1, 0) and (0, −1) mode, and a stationary phase may be referred to as (0, 0) mode, where 0, −1 and 1 are the picture repetition pattern values with which the respective motion vectors are weighted.

To generalize the displacement vector $\vec{D}$, it may be possible to indicate a motion vector between two temporally neighboring images within a temporal interval ($\vec{D}_{n,n-1}$, $\vec{D}_{n,n+1}$, $\vec{D}_{n-1}$, ...). The components of the temporal interval may represent the relative temporal position of the two images, indicated by the lower indices n,n−1. A picture repetition pattern value $c_{ij} \in (0, 1, -1)$ may be established, accounting for different relations between the temporal interval components $\vec{D}_{n,n-1}, \vec{D}_{n,n+1}, \vec{D}_{n-2}$ etc.

Since the displacement vectors may be equal up to a constant factor $C_{i,j}$, a displacement vector may expressed as $\vec{D}_{n,n-j} = c_j \vec{D}$. By this relation, the picture repetition pattern between two successive fields or frames may be accounted for with either $c_j=1, -1$ for uniform motion or $c_j=0$ for no motion at all. Using this coefficient as picture repetition pattern coefficient, block or object based motion estimation algorithms may be used, where field repetition patterns may already be accounted for. Such a minimization criterion may be $$SAD(\vec{C}, \vec{X}, n) = \sum_{P} \sum_{\vec{x} \in B(\vec{X})} |F(\vec{x}, n) - F(\vec{x} - c_p \vec{C}, n - p)|,$$

with $c_p$ being the coefficient of the displacement vector $\vec{D}_{n,n-p}$, for which the minimization criterion is satisfied. Thereby, different field repetition patterns may be accounted for, to find both the best matching displacement vector and the picture repetition pattern.

In case a whole sequence is in video mode and motion is locally accelerated non-uniformly, a local motion has a higher change to resemble one of the film phases. For instance, if the local motion is such that $|\vec{D}_{n,n+1}|$ is small and $|\vec{D}_{n,n-1}|$ is large, then the SAD may be smaller for the film mode than for the video mode, however the actual picture repetition pattern is video mode. This situation may result in errors that effect both the motion detection and motion estimation.

According to embodiments, this type of error may be avoided by providing a penalty system. Such a penalty system may be adapted by adding a penalty value P to the error function such that $$SAD(\vec{C}, \vec{X}, n) = \sum_{\vec{x} \in B(\vec{X})} |F(\vec{x}, n) - F(\vec{x} - \vec{C}, n - p)| + P(\vec{X}, n)$$

where $P(\vec{X}, n)$ is a penalty value. A penalty value may be chosen according to the majority mode detected in the field or frame n to be in one of the modes (1, −1), (1, 0) or (0, −1). A majority mode penalty $P_n$ may be given to the alternative modes in the field n+1 as follows.

In case video mode has been detected as majority mode in the current frame, a penalty $P_n$ may be given for the phases (1,0) and (0,−1) when determining the mode of the temporally next frame n+1.

In case in the current frame n the mode (1, 0) has been detected as majority mode, a penalty $P_n$ may be given for the phases (1, 0) and (1,−1) when determining the mode for the temporally next frame n+1.

In case the majority mode in the current frame n has been detected as (0,−1), a penalty $P_n$ may be given for the phases (0,−1) and (1,−1) in determining the mode in the temporally following frame n+1.

The application of the penalty value may already be determined from FIGS. 3a to 3c. As can be seen in FIG. 3a, in case video mode has been determined for the current frame, the next frame is also in video mode, therefore film modes (1,0) and (0,−1) need to be penalized, as it is less likely, that film mode occurs.

From FIG. 3b it may be seen, that in case film mode (1,0) has been detected, the following frame is probably not in film mode (1,0) or video mode (1,−1), therefore, these modes may be penalized.

From FIG. 3c it may be seen, that in case film mode (0,−1) has been detected, a penalty may be given to the phases (0,−1) or video mode (1,−1) as these are less likely to occur in the following frame.

The inventive motion estimator accounting for local picture repetition mode recognition provides high quality video format conversion algorithms. Motion estimation criteria may thus be applied to non-uniform motion patterns, which are encountered in film, video and hybrid sequences.

A computer for providing a motion parameter from an input video signal, in particular for de-interlacing a video signal, in particular according to a method of claim 1, comprises:

motion compensation means to calculate a motion compensated pixel from a pixel value of a first image using a candidate motion parameter set weighted with a picture repetition pattern value, calculation means to minimize an error criterion between at least one pixel value of a second image and at least the motion compensated pixel value by iterating the calculation of the motion compensated pixel with at least two candidate motion parameters sets and/or at least two picture repetition values, and choosing means to put out the candidate motion parameter set and/or the picture repetition value which provides the minimized error criterion.

The motion compensation means, the calculation means and the choosing means may be implemented using one processor. Normally, these functions are performed under control of a software program product. During execution, normally the software program product is loaded into a memory, like a RAM, and executed from there. The program may be loaded from a background memory, like a ROM, hard disk, or magnetical and/or optical storage, or may be loaded via a network like Internet. Optionally an application specific integrated circuit provides the disclosed functionality.

It should be noted that the above-mentioned embodiments illustrate rather than limit the invention and that those skilled in the art will be able to design alternative embodiments without departing from the scope of the appended claims. In the claims, any reference signs placed between parentheses shall not be constructed as limiting the claim. The word 'comprising' does not exclude the presence of elements or steps not listed in a claim. The word "a" or "an" preceding an element does not exclude the presence of a plurality of such elements. The invention can be implemented by means of hardware comprising several distinct elements and by means of a suitable programmed computer. In the unit claims enumerating several means, several of these means can be embodied by one and the same item of hardware. The usage of the words first, second and third, et cetera do not indicate any ordering. These words are to be interpreted as names.

The invention claimed is:

1. A method for providing a motion parameter set and/or a picture repetition pattern from an input video signal comprising:
   calculating a motion compensated pixel from a pixel value of a first image using a candidate motion parameter set weighted with a picture repetition pattern value,
   minimizing an error criterion between at least one pixel value of a second image and at least the motion compensated pixel value by iterating the calculation of the motion compensated pixel with at least two candidate motion parameters sets and/or at least two picture repetition values, and
   outputting the candidate motion parameter set and/or the picture repetition value which provides the minimized error criterion.

2. The method of claim 1, wherein the motion parameter set comprises a motion vector, a scaling value and/or a rotation value.

3. The method of claim 1, wherein the first image and the second image are temporally neighboring.

4. The method of claim 1, wherein the error criterion is an absolute difference.

5. The method of claim 1, wherein the image is segmented into groups of pixels and wherein the error criterion between the groups of pixels of a second image and motion compensated groups of pixels of a first image is minimized.

6. The method of claim 1, wherein the error criterion between at least one pixel value of a second image, and at least one motion compensated pixel value of a temporally previous image is minimized.

7. The method of claim 1, wherein the error criterion between at least one pixel value of a second image, and at least one motion compensated pixel value of a temporally following image is minimized.

8. The method of claim 1, with iterating between at least a first and a second weighted motion parameter set for motion compensation of pixels from the temporally previous image.

9. The method of claim 1, with iterating between at least a third and a fourth weighted motion parameter set for motion compensation of pixels from the temporally following image.

10. The method of claim 1, with iterating between at least a first and a second weighted motion parameter set for motion compensation of pixels from the temporally previous image, and with iterating between at least a third and a fourth weighted motion parameter set for motion compensation of pixels from the temporally following image.

11. The method of claim 10, wherein the weighting values of the first and the third motion parameters sets are chosen to be zero.

12. The method of claim 10, wherein the weighting values of the second and the fourth motion parameter sets are chosen to be of equal absolute value.

13. The method of claim 1, with minimizing a difference between a) a pixel value calculated from at least one pixel of a current image and at least one motion compensated pixel value of a temporally previous image and b) a pixel value calculated from at least one pixel of a current image and at least one motion compensated pixel value of a temporally following image, by iterating the calculation of the motion compensated pixel with at least two candidate motion parameters sets and/or at least two picture repetition values.

14. The method of claim 1, with minimizing a difference between a) an interpolated pixel value from at least one pixel of a current image and at least one motion compensated pixel value of a temporally previous image and b) an interpolated pixel from at least one pixel value of a current image and at least one motion compensated pixel value of a temporally following image, by iterating the calculation of the motion compensated pixel with at least two candidate motion parameters sets and/or at least two picture repetition values.

15. The method of claim 1, with penalizing calculated error criteria depending on field repetition patterns detected in a spatio-temporal neighborhood.

16. The method of claim 1, with penalizing calculated error criteria that are calculated from candidate motion parameter sets weighted with a picture repetition pattern value corresponding to a picture repetition pattern not detected in a spatio-temporal neighborhood.

17. A computer program product, comprising a computer usable medium having a non-transitory computer readable program code embodied therein, said computer readable program code adapted to be executed to provide a method for providing a motion parameter set and/or a picture repetition pattern from an input video signal, the method comprising:
   calculating a motion compensated pixel from a pixel value of a first image use a candidate motion parameter set weighted with a picture repetition pattern value,
   minimizing an error criterion between at least one pixel value of a second image and at least the motion compensated pixel value by iterating the calculation of the motion compensated pixel with at least two candidate motion parameters sets and/or at least two picture repetition values, and
   outputting the candidate motion parameter set and/or the picture repetition value which provides the minimized error criterion.

18. An integrated circuit for providing a motion parameter set and/or a picture repetition pattern from an input video signal, comprising:
   a first processing module that calculates a motion compensated pixel from a pixel value of a first image using a candidate motion parameter set weighted with a picture repetition pattern value,
   a second processing module that calculations means to minimize an error criterion between at least one pixel value of a second image and at least the motion compensated pixel value by iterating the calculation of the motion compensated pixel with at least two candidate motion parameters sets and/or at least two picture repetition values, and
   a third processing module that outputs the candidate motion parameter set and/or the picture repetition value which provides the minimized error criterion.

* * * * *